United States Patent
Minami et al.

(10) Patent No.: US 6,388,669 B2
(45) Date of Patent: May 14, 2002

(54) SCHEME FOR INTERACTIVE VIDEO MANIPULATION AND DISPLAY OF MOVING OBJECT ON BACKGROUND IMAGE

(75) Inventors: Kenichi Minami; Yoshinobu Tonomura; Akihito Akutsu; Yukinobu Taniguchi; Takashi Satou, all of Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/776,374

(22) Filed: Feb. 2, 2001

Related U.S. Application Data

(62) Division of application No. 09/099,189, filed on Jun. 18, 1998.

(30) Foreign Application Priority Data

Jun. 20, 1997 (JP) ............................................. P9-163632
Dec. 19, 1997 (JP) ............................................. P9-351145

(51) Int. Cl.[7] ............................................. G06T 15/70
(52) U.S. Cl. ........................... 345/474; 345/723; 725/37
(58) Field of Search ............................ 386/46; 345/723, 345/474; 725/37

(56) References Cited

U.S. PATENT DOCUMENTS

| | | | |
|---|---|---|---|
| 5,107,252 A | 4/1992 | Traynar et al. | 340/712 |
| 5,670,992 A | 9/1997 | Yasuhara et al. | 345/173 |
| 5,687,306 A | 11/1997 | Blank | 395/135 |

OTHER PUBLICATIONS

RCA Model VR673HF Video Cassette Recorder User's Guide, 1994, pp. 17–21.*
ADOBE Premiere 3.0 USER's Guide, 1996.*
Cowart, Mastering Windows 3.1 Special Edition, 1992, pp. 326–327.
Video Tomography: An efficient method for Camerawork Extraction and Motion Analysis, by Akihito Akutsu et al., ACM Multimedia 94, Proceedings, Second ACM International Conference on Multimedia, Oct. 15–20, 1994, San Francisco, California, (pp. 349–356).

(List continued on next page.)

*Primary Examiner*—Mark Zimmerman
*Assistant Examiner*—Lance W. Sealey
(74) *Attorney, Agent, or Firm*—Olson & Hierl, Ltd.

(57) ABSTRACT

A scheme for interactive video manipulation and display of a moving object on a background image is disclosed. In this scheme a background image stored in a background image storage unit is read out and displayed on a screen, and a manipulation target spatial position is set on the screen. Then, a partial image to be synthesized and displayed is uniquely specified from partial images which are set in correspondence to spatial positions on the background image and representing an object moving on the background image, according to the manipulation target spatial position set by the setting step, and the partial image as specified by the specifying step is read out from a partial image storage unit, and synthesized and displayed at the manipulation target spatial position on the background image. A scheme for realizing a variable speed video playback with a playback speed different from a normal one is also disclosed.

9 Claims, 13 Drawing Sheets

OTHER PUBLICATIONS

QuickTime VR—An Image-Based Approach to Virtual Environment Navigation, by Shenchang Eric Chen, Apple Computer Inc., Computer Graphics Proceedings, Annual Conference Series, 1995 (pp. 29–38).

An Architecture for Multiple Perspective Interactive Video, Patrick H. Kelly, et al., Visual Computing Laboratory, MultiMedia '95 (Proceedings), The Third ACM International Multimedia Conference and Exhibition (pp. 201–212).

Video Interface For Spatiotemporal Interactions Based on Multi-Dimensional Video Computing, by Akihito Akutsu, et al., NTT Human Interface Laboratories, ICASSP 97, 1997 International Conference on Acoustics, Speech, and signal Processing, Apr. 21–24, 1997, vol. I of V, IEEE Computer Society (pp. 191–194).

* cited by examiner

TIME AXIS CURSOR

FIELD OF VIEW MOVING CURSOR

SCHEME FOR INTERACTIVE VIDEO MANIPULATION AND DISPLAY OF MOVING OBJECT ON BACKGROUND IMAGE

RELATED APPLICATION

This application is a division of U.S. patent application Ser. No. 09/099,189, filed Jun. 18, 1998 and entitled Scheme for Interactive Video Manipulation and Display of Moving on Background Image.

BACKGROUND OF THE INVENTION

1. Field of the Invention

The present invention relates to a scheme for interactive video manipulation and display in which a background image is displayed on a computer screen on which a position is interactively specified by a user using a pointing device such as mouse, touch screen, etc., and a partial image of a moving object that is set in correspondence to that specified position is synthetically displayed at that specified position so as to express a series of actions of the moving object on the background image.

2. Description of the Background Art

The conventionally known examples for carrying out some manipulations related to the video display on a computer includes that which displays a corresponding frame image by manipulating a time axis with respect to a video image. For example, in the QuickTime player of the Apple Computer Inc., as shown in FIG. 1, when a slider (a time axis cursor) corresponding to a time axis is manipulated to specify a specific time, a frame image corresponding to the specified time is displayed on a display window. In this example, there is no manipulation related to the image space so that it is an example for expressing the video solely on the time axis basis.

On the other hand, the QuickTimeVR player of the Apple Computer Inc. is an interface in which a panorama image of large aspect ratio is viewed through a window, which employs a mechanism by which a hidden portion located outside the window can be displayed according to a right or left movement of a mouse cursor (field of view moving cursor), as shown in FIG. 2. In this case, the window is virtually moved with respect to the background image according to an amount and a direction of relative displacement of a mouse. In this example, there is no time axis information and no manipulation on the displayed image itself, and only the field of view of the window is manipulated.

From a viewpoint of the interactive display of video, in particular, the conventional schemes such as those described above are mostly examples in which only a time axis is manipulated on solely time axis basis as in the example of FIG. 1, and even in the example of FIG. 2 which is not directed to the manipulation on time axis basis, the direction and the relative amount of displacement for the mouse cursor manipulation are used only for manipulating a field of view of the window and there is no manipulation of information that is directly related to a position on the actual background image.

Thus conventionally there has been no interface for interactively manipulating the display on basis of positions on the background image.

Now, the video playback speed can be changed to a prescribed playback speed as in the case of the fast forward playback mode in a general video playback device or to arbitrary playback speed in some devices, where the video is playbacked from a current position until a stop request is issued according to inputs from buttons, jog shuttle, slider, etc. At this point, most of the conventionally known devices only offer the video display.

In the prior art, the playback end point is not to be specified in advance, so that when a user carries out the fast playback, for example, it is necessary for the user to watch the displayed video image carefully in order to judge a proper playback end point and therefore there is a heavy load on the user. As a method for specifying the playback end point, it is possible to consider a method in which a time code or a frame number of the video image is to be entered, but this method lacks the intuitive feel, so that there is a need for a method in which an input can be made while visually checking the video image of the playback end point. In this regard, a method in which the video image is divided at equal intervals and top images of the divided intervals are arranged as static images is not desirable as it would require a separate region or monitor for displaying the playbacked video image.

Moreover, in the case of playbacking sounds, there is a problem that the sounds as a whole will become difficult to listen to as they will be pitched higher in the case of fast playback or lower in the case of slow playback.

SUMMARY OF THE INVENTION

It is therefore an object of the present invention to provide a scheme for interactive video manipulation and display of a moving object on a background image, which is capable of expressing an object image interactively at positions sequentially occupied by the object on the background image in such cases where the object exhibits a series of actions within the background image, by removing restrictions of the prior art.

It is another object of the present invention to provide a scheme for interactive video manipulation and display capable of realizing a variable speed video playback with a playback speed different from a normal one in which, when a user specifies the playback start and end points visually, a playback speed is set up from a continuous range according to a time taken in specifying the playback start and end points while the frequency variation of sounds at a time of fast or slow playback is suppressed.

According to one aspect of the present invention there is provided an apparatus for interactive video manipulation and display, comprising: a background image storage unit for storing a background image; a display unit for displaying the background image stored in the background image storage unit; a partial image storage unit for storing partial images which are set in correspondence to spatial positions on the background image and representing an object moving on the background image; a setting unit for setting a manipulation target spatial position on a screen of the display unit; a specifying unit for uniquely specifying a partial image to be synthesized and displayed according to the manipulation target spatial position set by the setting unit; and a synthesis display unit for reading out the partial image as specified by the specifying unit from the partial image storage unit, and synthesizing and displaying the partial image at the manipulation target spatial position on the background image displayed by the display unit.

According to another aspect of the present invention there is provided a method for interactive video manipulation and display, comprising the steps of: reading out a background image stored in a background image storage unit and displaying the background image on a screen; setting a manipulation target spatial position on the screen; uniquely specifying a partial image to be synthesized and displayed from partial images which are set in correspondence to spatial positions on the background image and representing an object moving on the background image, according to the manipulation target spatial position set by the setting step; and reading out the partial image as specified by the specifying step from a partial image storage unit, and synthesizing and displaying the partial image at the manipulation target spatial position on the background image.

According to another aspect of the present invention there is provided an article of manufacture, comprising: a computer usable medium having computer readable program code means embodied therein for causing a computer to function as an apparatus for interactive video manipulation and display, the computer readable program code means includes: first computer readable program code means for causing said computer to read out a background image stored in a background image storage unit and display the background image on a screen; second computer readable program code means for causing said computer to set a manipulation target spatial position on the screen; third computer readable program code means for causing said computer to uniquely specify a partial image to be synthesized and displayed from partial images which are set in correspondence to spatial positions on the background image and representing an object moving on the background image, according to the manipulation target spatial position set by the second computer readable program code means; and fourth computer readable program code means for causing said computer to read out the partial image as specified by the third computer readable program code means from a partial image storage unit, and synthesizing and displaying the partial image at the manipulation target spatial position on the background image.

According to another aspect of the present invention there is provided an apparatus for interactive video manipulation and display, comprising: an input unit for entering a start point and an end point on a time axis; a playback speed calculation unit for calculating a playback speed for a video according to the start point, the end point, and an input time taken since the start point is entered until the end point is entered; and a playback unit for playbacking the video at the playback speed.

According to another aspect of the present invention there is provided a method for interactive video manipulation and display, comprising the steps of: entering a start point and an end point on a time axis; calculating a playback speed for a video according to the start point, the end point, and an input time taken since the start point is entered until the end point is entered; and playbacking the video at the playback speed.

According to another aspect of the present invention there is provided an article of manufacture, comprising: a computer usable medium having computer readable program code means embodied therein for causing a computer to function as an apparatus for interactive video manipulation and display, the computer readable program code means includes: first computer readable program code means for causing said computer to enter a start point and an end point on a time axis; second computer readable program code means for causing said computer to calculate a playback speed for a video according to the start point, the end point, and an input time taken since the start point is entered until the end point is entered; and third computer readable program code means for causing said computer to playback the video at the playback speed.

Other features and advantages of the present invention will become apparent from the following description taken in conjunction with the accompanying drawings.

DETAILED DESCRIPTION OF THE PREFERRED EMBODIMENTS

Referring now to FIG. 3 to FIG. 9, the first embodiment of an interactive video manipulation and display scheme according to the present invention will be described in detail.

Figure 1:
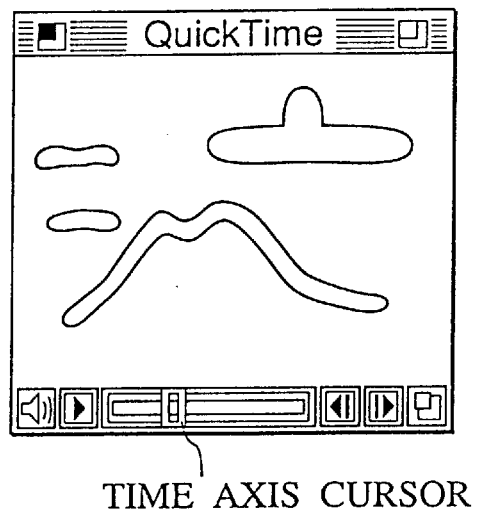
FIG. 1 is a diagram showing one exemplary conventional video display scheme using a manipulation on the time axis basis.
Figure 2:
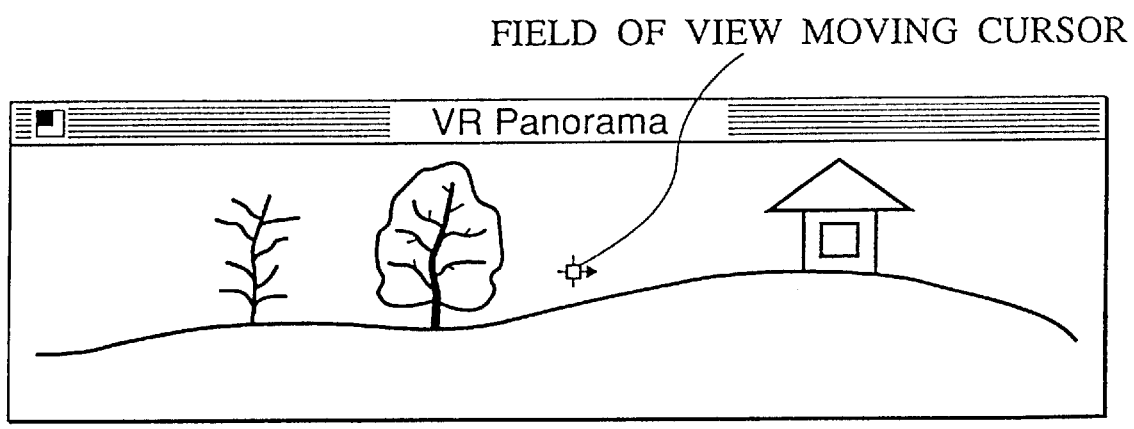
FIG. 2 is a diagram showing another exemplary conventional video display scheme using a field of view manipulation.
Figure 3:
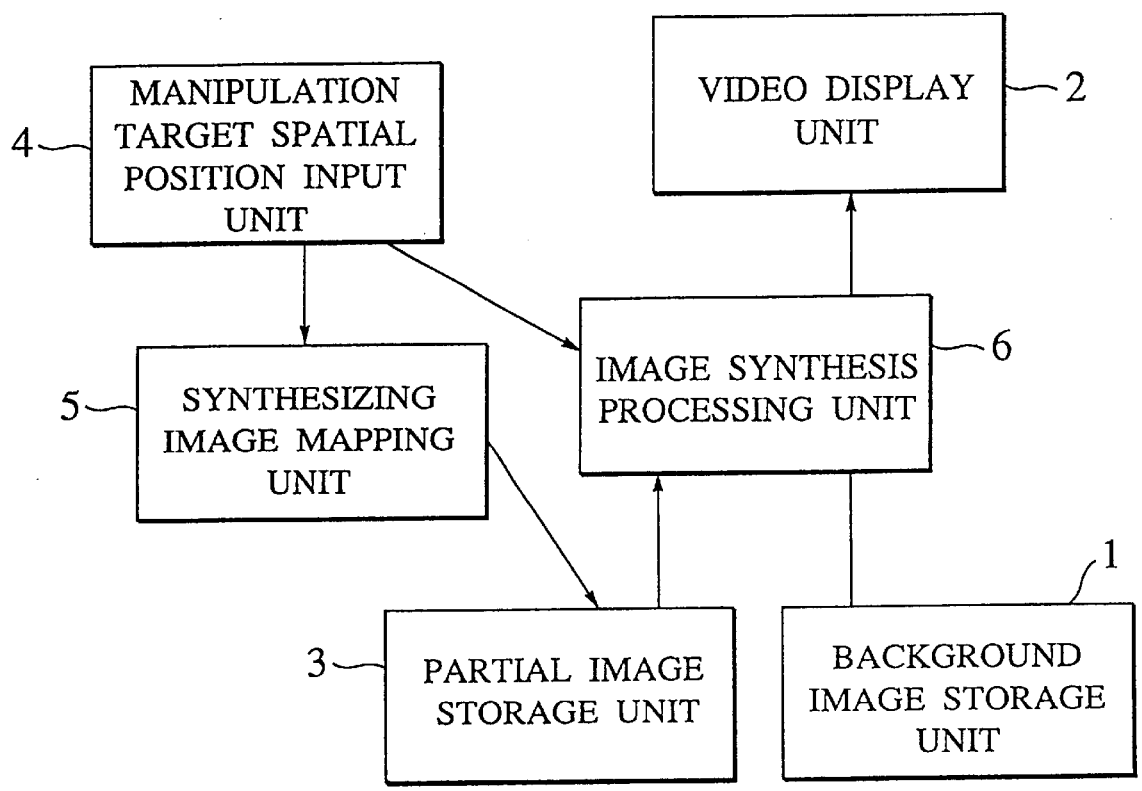
FIG. 3 is a block diagram showing an exemplary configuration of an interactive video manipulation and display device according to the first embodiment of the present invention.

FIG. 3 shows an exemplary configuration of an interactive video manipulation and display device according to the first embodiment, which comprises a background image storage unit 1, a video display unit 2, a partial image storage unit 3, a manipulation target spatial position input unit 4, a synthesizing image mapping unit 5, and an image synthesis processing unit 6.

Figure 4:
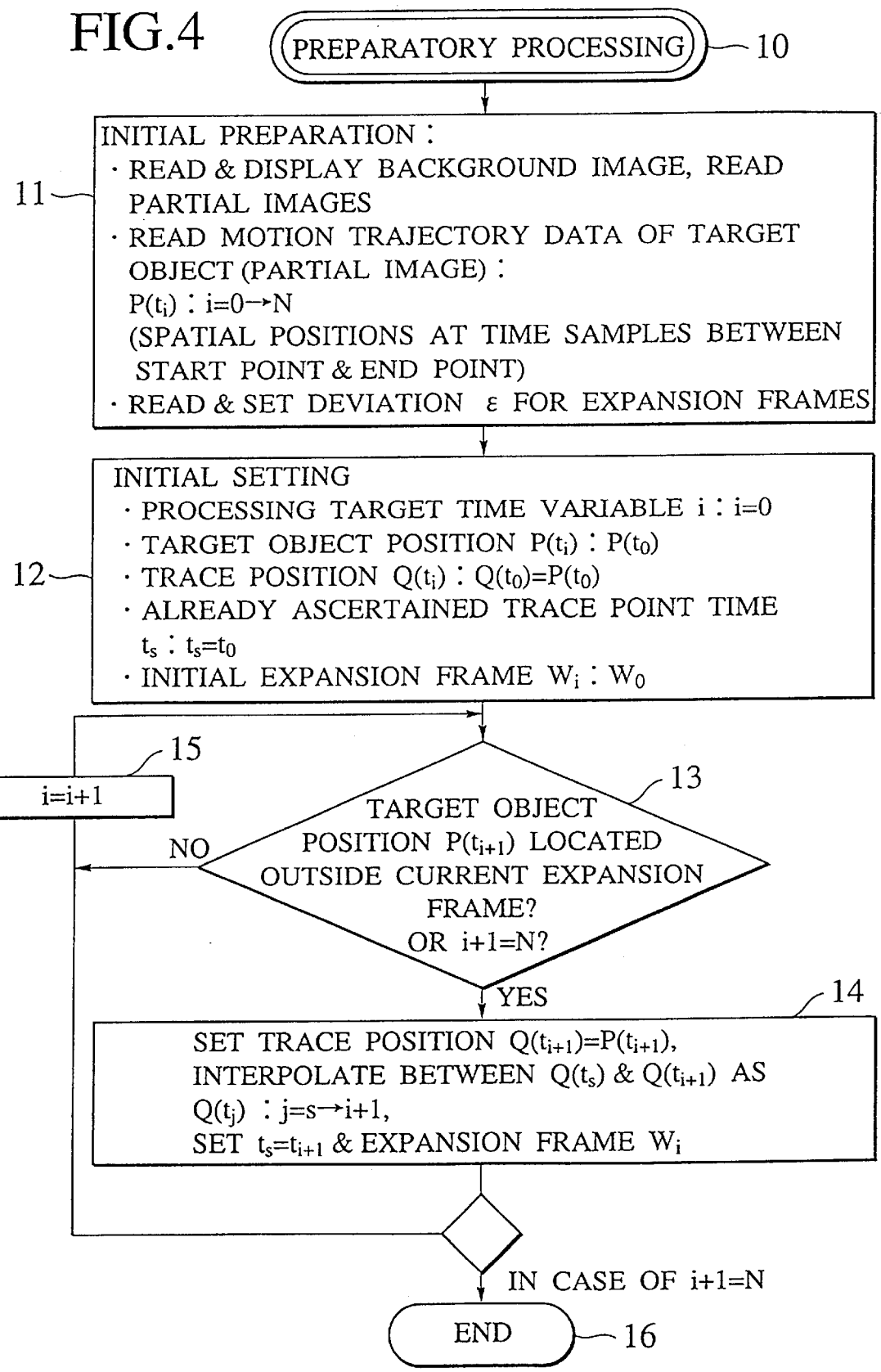
FIG. 4 is a flow chart of a preparatory processing to be carried out by the interactive video manipulation and display device of FIG. 3.

FIG. 4 shows a flow chart for the procedure of a preparatory processing for the purpose of realizing the interactive processing in the interactive video manipulation and display device of FIG. 3.

In this preparatory processing 10 of FIG. 3, the initial preparation step 11 carries out initial preparation and setting of various basic data. For example, the background image is stored in the background image storage unit 1. To this end, the video image produced by separate means can be used, but it is also possible to produce the background image automatically by the processing as disclosed in Japanese Patent Application Laid Open No. 6-98206 (1994), for example. In this processing, using the video image obtained by the camera operation such as panning (an operation for swinging the camera right and left), the background image can be automatically produced by checking displacements among frame images by analyzing stripe patterns corresponding to the camera operation as produced by the background objects in a spatio-temporal image of that video image, and splicing the frame images while displacing them as much as the checked displacements respectively.

Figure 5:
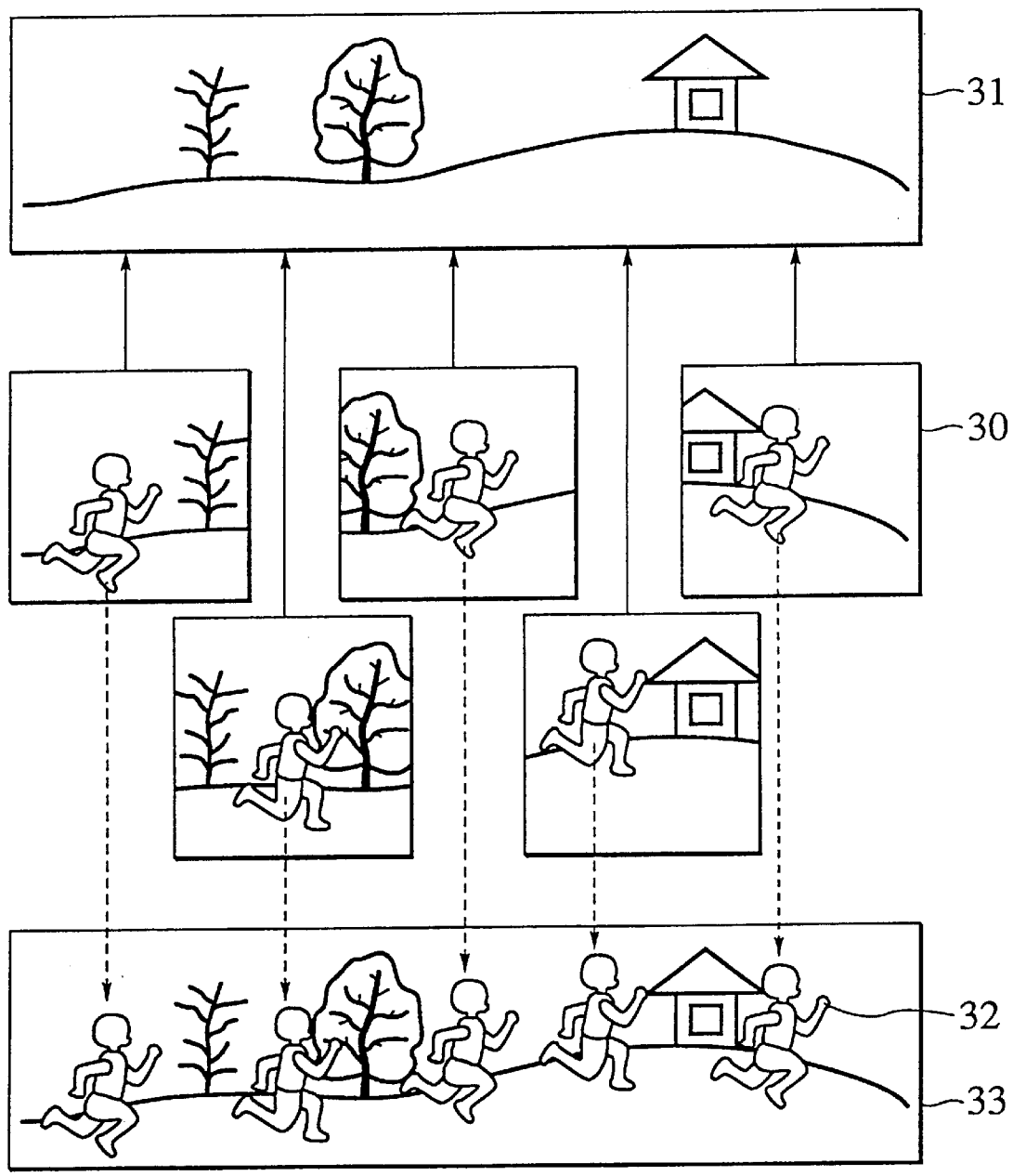
FIG. 5 is a diagram for explaining a method for producing a panorama background image from an original video obtained by panning a camera in the interactive video manipulation and display device of FIG. 3.

FIG. 5 shows an exemplary background image production processing in which the background image is produced from the video image that is acquired while panning the camera to the right according to the above described procedure. In this example, when the frame images 30 are spliced sequentially, non-overlapping portions of the frame images 30 form the background image 31.

In this background image production processing, it is also possible to record an object image (partial image) 32 along with a position information with respect to each frame, by carrying out region recognition, extraction and tracing either manually or automatically with respect to a moving object within that video image at the same time. The object specific partial image 32 so obtained is an image in which both image content and position are changing in time, and it is possible to create an image 33 which is useful in comprehending a motion of that object within the background image by synthesizing this partial image 32 at the originally extracted positions again, on the background image 31 from which it is originally extracted. Thus the partial image used in this. invention is basically inseparable from the background image, and sequentially related to corresponding positions at respective times.

The partial image produced in advance as described above is stored in the partial image storage unit 3 along with its extraction position information. Here, the extraction position information is an information for uniquely identifying a position of the object such as that which indicates a coordinate position on the background image of a center of gravity or a lower left corner of a circumscribed quadrilateral containing the object at a time of extracting the image.

Figure 6:
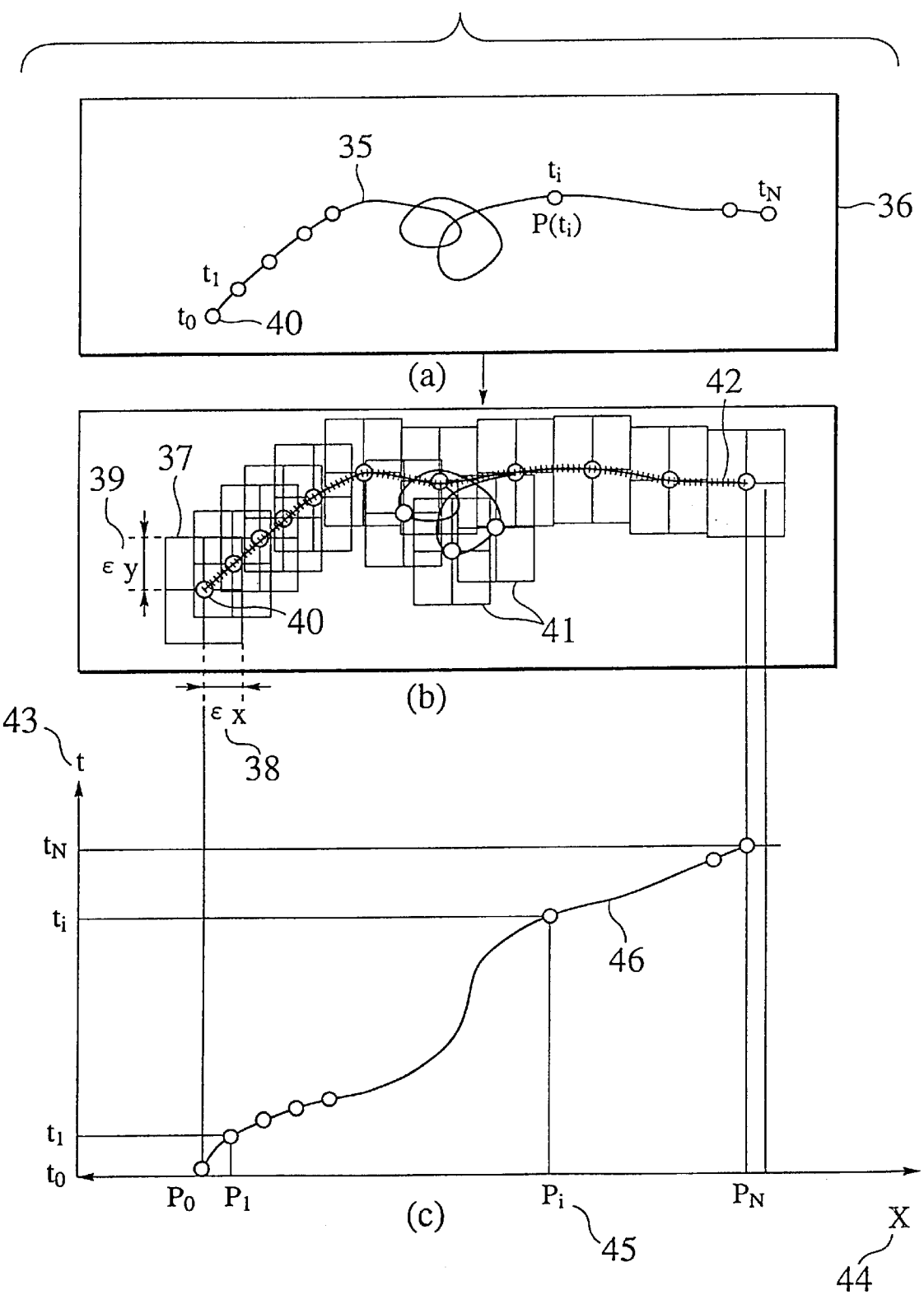
FIG. 6 is a diagram showing a moving object trajectory, a simplified moving object trajectory, and a mapping from background image spatial positions to a partial image time positions which are obtained by the preparatory processing of FIG. 3.

A part (a) of FIG. 6 shows a trajectory 35 of the object which exhibits a complicated motion within the background image. In the initial preparation step 11, the motion trajectory data 35 of the partial image (also referred to as a target object hereinbelow) on the background image as obtained through the above described processing procedure are entered as $P(t_i)$, where $t_i$ denotes a time position 40 corresponding to each frame of the partial image, and $0 \leq i \leq N$ for a prescribed integer N, for example. In addition, in order to trace the motion trajectory of the target object as an outline trajectory in which minute fluctuations are suppressed as shown in a part (b) of FIG. 6, expansion frames 37 obtained by expanding the target object positions in ± directions by a deviation $\epsilon$ ($\epsilon x$ 38 and $\epsilon y$ 39 in vector notation) are to be used, and to this end a value of $\epsilon$ is set according to the selection made by a user or a system side in advance.

Next, the processing corresponding to each time is carried out. For the processing target $t_i$, the target object initial position $P(t_i)$, the motion trajectory trace point position $Q(t_i)$, the expansion frame $W_i$ obtained by expanding the target object positions by a deviation $\epsilon$, and a time position $t_s$ for the already ascertained trace point are set to initial values using an initial time $t_0$ at the initial setting step 12 of FIG. 4.

Then, as a processing at each $t_i$, whether the target object position $P(t_{i+1})$ at the time $t_{i+1}$ is going to be located outside the current expansion frame centered around the already ascertained trace point $Q(t_s)$ or not is judged at the step 13. If it is not going to be located outside the current expansion frame, the variable i is incremented by one at the step 15 next, and then the step 13 is repeated.

On the other hand, if it is going to be located outside the current expansion frame as in the cases of the expansion frames 41 shown in a part (b) of FIG. 6, next at the step 14, $P(t_{i+1})$ is newly set as the trace point $Q(t_{i+1})$ and a section between $Q(t_s)$ and $Q(t_{i+1})$ is interpolated so as to determine the trace position at each time position within that section. Here, the interpolation method can be selected according to the required smoothness, from the known methods such as the simple linear interpolation, the Bezier curve approximation, etc. Also, at the step 14, $t_i$ is newly set as $t_s$ while the expansion frame is also newly set, and after the variable i is incremented by one at the step 15, the step 13 is repeated again.

Also, at the step 13, whether i+1 becomes equal to N is checked, and when it reached to the last time position $t_N$ for the target object, after the interpolation processing is carried out at the step 14, the preparatory processing 10 is finished at the step 16.

As a result of the preparatory processing described above, a new trace trajectory 42 (indicated as a dotted line) as shown in a part (b) of FIG. 6 can be obtained. When compared with the motion trajectory 35 of a part (a) of FIG. 6, this trace trajectory 42 is a curve which is simplified at portions where the motion trajectory 35 involves loops. This result can be depicted as a mapping from a spatial position 44 to a time position 43, as shown in a part (c) of FIG. 6, where only one dimension along the X axis is expressed as the spatial position for the same of simplicity.

Figure 7:
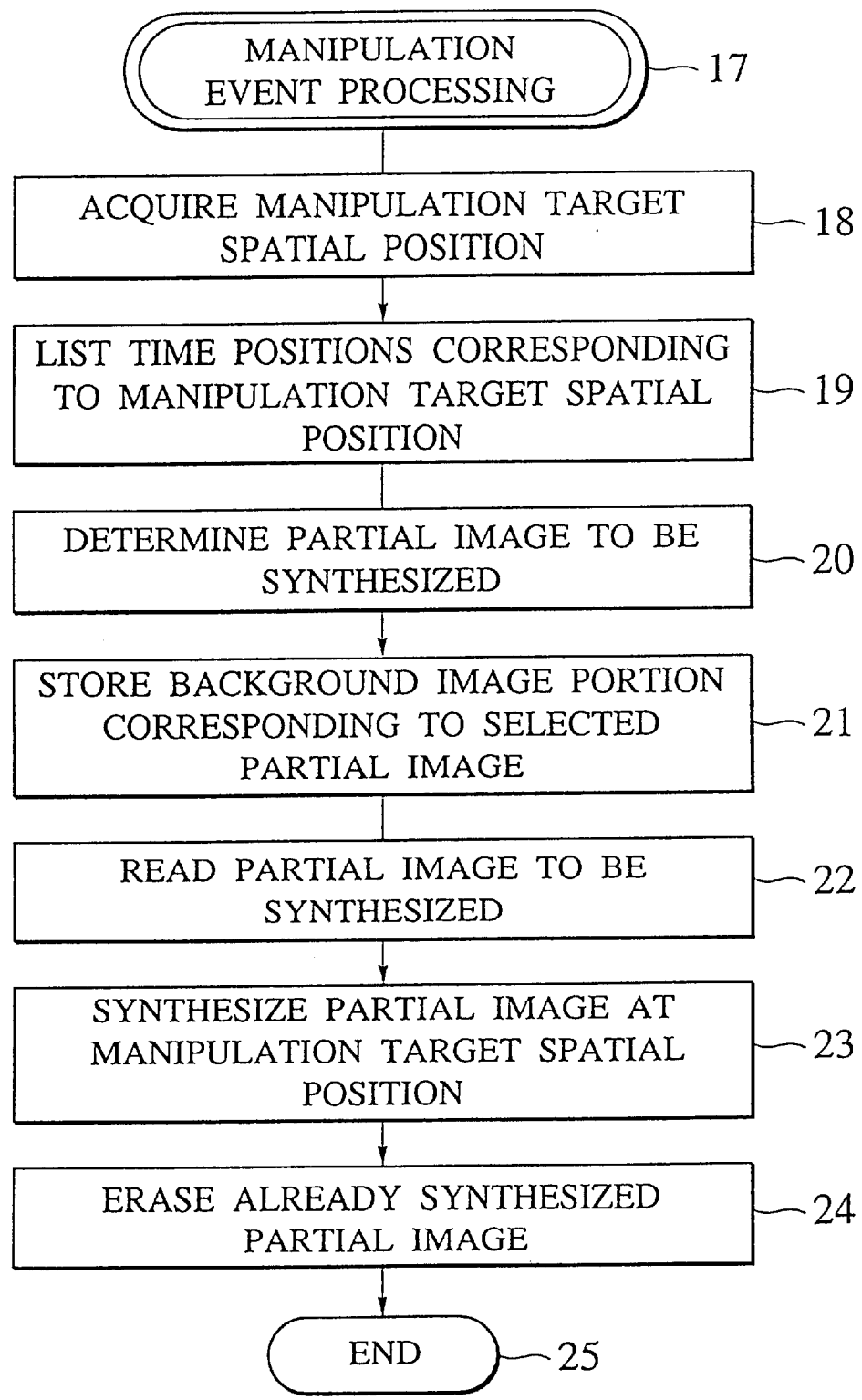
FIG. 7 is a flow chart of a manipulation event processing to be carried out by the interactive video manipulation and display device of FIG. 3.

After this preparatory processing is completed, the interactive processing (the manipulation event processing) at a time of actual use of the device is carried out according to the flow chart of FIG. 7.

First, among events that occur as the user carries out some manipulations, when a specific event that is pre-defined to be directed to this manipulation event processing occurs, the manipulation event processing 17 of FIG. 7 is activated. This event is set to occur when a point within the background image is specifically pointed during a mouse input event processing, for example.

Figure 8:
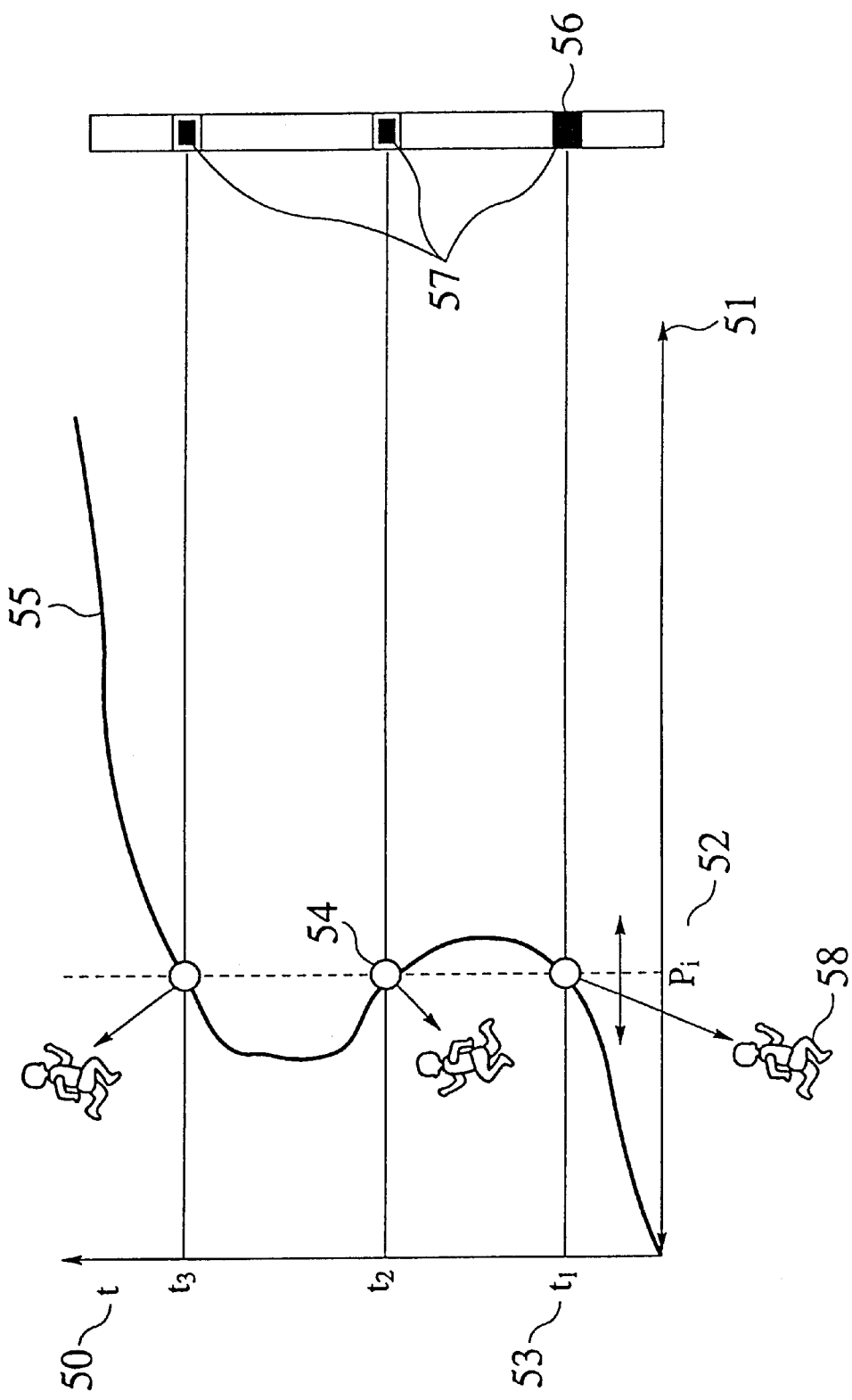
FIG. 8 is a diagram showing an exemplary mapping from background image spatial positions to partial image time positions which is to be handled by the manipulation event processing of FIG. 7.

Then, the partial image to be used for image synthesis is determine. In the following, the processing for an exemplary case of more complicated mapping as shown in FIG. 8 in which a plurality of time positions exist in a vicinity of one and the same spatial position will be described. For example, a manipulation target spatial position information is acquired in relation to the event at the step 18. Also, at the step 19, the time positions 53 at which the target object exists in correspondence to the pointed manipulation target spatial position Pi 52 are listed (as t1, t2 and t3 in the example of FIG. 8) according to the mapping 55 between the time position 50 and the spatial position 51 as shown in FIG. 8. In the example of FIG. 8, the space is represented one dimensionally by the horizontal axis for the same of simplicity, but the case of using two or more dimensions can be handled similarly.

Then, at a the step 20, the partial image to be synthesized is determined by selecting one time position among those listed by the step 19. Here, various rules can be used in making this selection. For example, using a display indicators 57 as shown in FIG. 8, the earliest time t1 is simply selected first, and then the time to be selected is changed sequentially in response to the double click, from a set of times listed by this display indicators 57. It is also possible to synthesize the partial image continuously from the immediately previous operation by selecting a value closest in time to a time position corresponding to the spatial position specified by the immediately previous operation, by mapping the successive manipulation target spatial positions into corresponding continuous time positions when the successive manipulation target spatial positions are specified continuously.

In this step 20, the partial image 58 which is the target object corresponding to each manipulation target spatial position can be uniquely specified by the time position determined from the mapping 55. Also, at this point, at the step 21, the background image portion corresponding to the selected partial image is to be stored for the purpose of later use.

Next, the selected partial image is read out from the partial image storage unit 3 at the step 22, and then synthesized and displayed at an original position of that partial image within the background image at the step 23. Here, the synthesis can be realized by changing the synthesis method depending on the purpose of expression, from the available synthesis methods such as a method in which the partial image is overwritten with respect to the background image, a method for mixing the partial image with the background image at some transparency rate, etc.

Using the specified manipulation target spatial position as a starting position, when the position is displaced further (while pressing the mouse button, for example), it is possible to trace over the trace line on the mapping of FIG. 8 in a state of maintaining the continuity. When the tracing goes off the trace line as the manipulation target spatial position is sequentially displaced, the manipulation event processing 17 is finished at the step 25. Here, it is possible to devise the display form variously according to the expression effect, such as a form in which the image already synthesized at the current position is to be immediately erased, a form in which it is erased only for a predetermined period of time, a form in which it is left there subsequently, and so on. In the case of erasing, the background image portion stored at the step 21 is used in erasing the already synthesized partial image at the step 24.

It is also possible to synthesize and display successive partial images continuously or at constant time interval for a prescribed period of time starting from or ending at a time position corresponding to the specified manipulation target spatial position, without tracing, when an arbitrary position playback mode setting a playback direction setting are made by specifying a single manipulation target spatial position and a forward or backward direction.

In addition, there can be cases where the displayed background image has such a large aspect ratio that it cannot be displayed entirely at once, or cases where it is desired to watch details of a particular portion, and in such cases, it is also possible for the image synthesis processing unit to synthesize and display the partial image and the background image by enlarging or contracting the partial image and the background image, depending on an enlarging or contracting mode specified from a user.

Next, the playback of sounds at a time of tracing will be described. In this first embodiment, while trancing is carried out, the time position at which the target object exists is obtained from the current manipulation target spatial position at appropriately short time interval. Here, a method for obtaining the time position can be the same as in the case of handling the image described above, For example, when the time interval is set to be 0.5 sec., the time position is obtained at every 0.5 sec. Then, the sound data corresponding to a period between the current time position and the immediately previous time position are entered and playbacked such that the playback can be finished just within the time interval, by compressing or expanding the entered sound data depending on whether the difference between the current time position and the immediately previous time position is longer or shorter than the time interval.

Here, the compression/expansion of the sound data can be realized by a method for thinning or thickening the sound data at appropriate interval, but the thinning makes the pitch of the entire sounds higher while the thickening makes the pitch of the entire sounds lower so that the resulting sounds may become hard to listen to. For this reason, it is also possible to use the following method which only processes portions at which the frequency characteristics of the sound data are redundant in time. First, the entered sound data are segmented into segments in units of several tens of milliseconds, and correlations among the segments are obtained. When the correlation between the neighboring segments is high, these segments are judged as redundant, and data of these segments are thinned or thickened.

In the case of the sound data for human speech in particular, the redundancy is often found in the sound data corresponding to the vowel sounds of the speech, so that it is possible to realize the efficient processing by detecting the vowel sounds before obtaining the correlations and subjecting the detected portions alone to the further processing. The spectrum of the vowel sound has the harmonic structure in which peaks appear at integer multiples of the fundamental frequency, so that it is possible to detect a position of the vowel sound by detecting the harmonic structure using a comb filter and the like. Note however that the harmonic structure can also be observed in the musical sound and the like so that it is necessary to remove the musical sound components in advance. The musical sound has the characteristic that the frequency variation in time is smaller compared with the speech so that the musical sound components can be removed by obtaining the spectrogram of the sound data and deleting peaks of the spectra which are stable in the frequency direction over a prescribed period of time. Note that peaks of the spectrum can be obtained by utilizing the characteristic that a difference of the adjacent spectrum values in the frequency direction is large for a peak.

Figure 9:
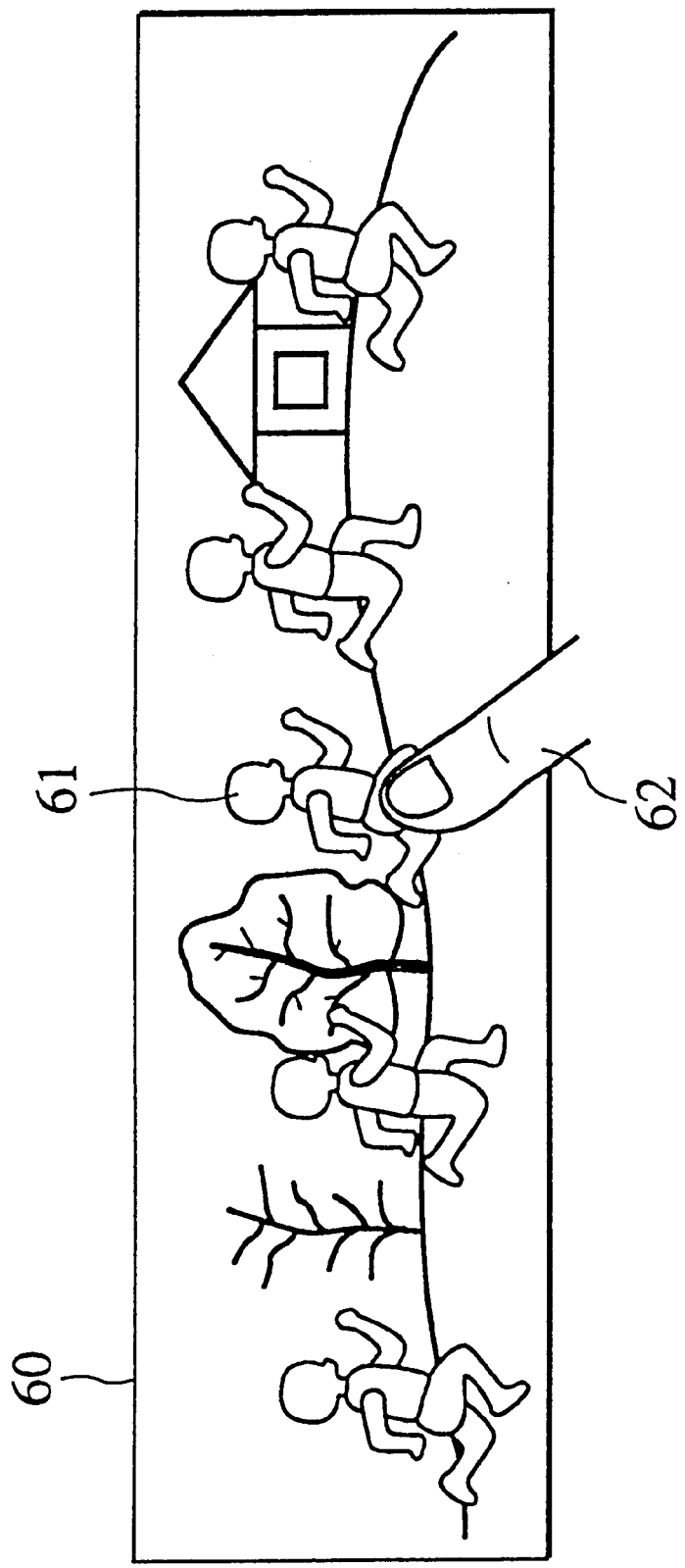
FIG. 9 is a diagram showing an exemplary case of interactive manipulation using a display integral touch screen as a pointing device in the interactive video manipulation and display device of FIG. 3.

FIG. 9 shows an exemplary case of carrying out the manipulation interactively according to the above described processing, using a display integral touch screen as a pointing device for entering the manipulation target spatial position. In FIG. 9, a finger 62 specifies the manipulation target spatial position on the background image 60, and the partial image 61 is synthesized at the specified position. When the display integral touch screen is used as in FIG. 9, it is possible for a user to control the video image of the moving object interactively within the background image in such a manner that it appears as if the target object is touched and moved by the finger.

In the case of carrying out such a manipulation, it is possible to separate the manipulation target spatial position from the target object for arbitrary distance in order to prevent an image of the target object from being hidden by the finger. Also, in the case of using a mouse and the like as the pointing device, the target object may be hidden behind a cursor, so that it is possible to display the cursor in a transparent form showing only its contour, at a time of specifying the manipulation target spatial position.

It is also to be noted that the above described first embodiment according to the present invention may be conveniently implemented using conventional general purpose digital computers programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the processing procedures of FIG. 4 and FIG. 7, the procedure for generating the video image from the background image to be stored, and the procedure for extracting the partial image to be stored from the original images from which the background image is produced as described in the first embodiment can be conveniently implemented in forms of software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

As described, according to this first embodiment, in the case where an object exhibits a series of actions within the background image, it is possible to express an image of that object on basis of positions sequentially occupied by that object in time, by directly specifying the spatial positions on the background image such as a panorama image, instead of utilizing the video playback based on indirect time axis control.

In other words, according to this first embodiment, the background image is displayed on a display screen, and a user specifies the manipulation target spatial position on the display screen using a pointing device such as mouse. Then, the partial image to be synthesized is uniquely determined from the manipulation target spatial position, and then synthesized and displayed at the specified spatial position. Consequently, when the user sequentially changes the manipulation target spatial position, a series of partial images that are set in correspondences to the respective positions within the background image are displayed. From a viewpoint of the user, this scheme largely differs from the conventional scheme in that the manipulation can be carried out by using the background image as a clue at a time of displaying a series of partial images that are set in correspondences to the respective positions within the background image.

Referring now to FIG. 10 to FIG. 14, the second embodiment of an interactive video manipulation and display scheme according to the present invention will be described in detail.

Figure 10:
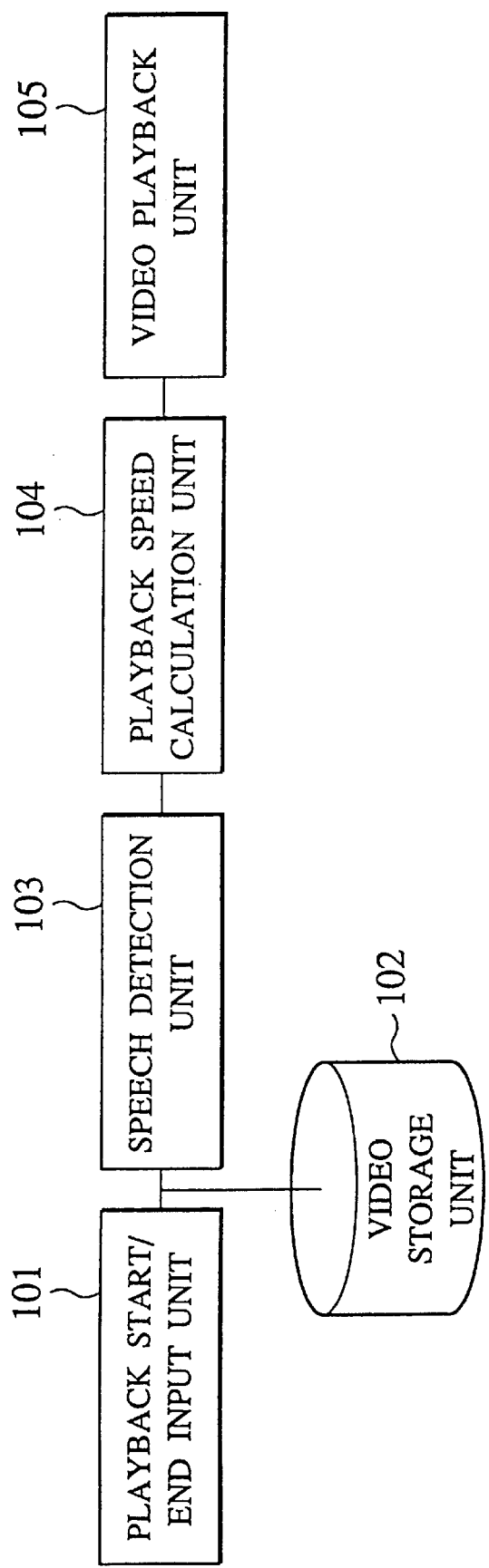
FIG. 10 is a block diagram showing one exemplary configuration of an interactive video manipulation and display device according to the second embodiment of the present invention.

FIG. 10 shows an exemplary configuration of an interactive video manipulation and display device according to the second embodiment, which comprises a playback start/end input unit 101 for entering a start point and an end point of the video playback; a video storage unit 102 for storing video data; a speech detection unit 102 for detecting speeches; a playback speed calculation unit 104 for calculating a playback speed; and a video playback unit 105 for playbacking the video at the calculated playback speed. The processing of the video playback unit 105 can also be carried out with respect to the speech section detected by the speech detection unit 103 alone.

Figure 11:
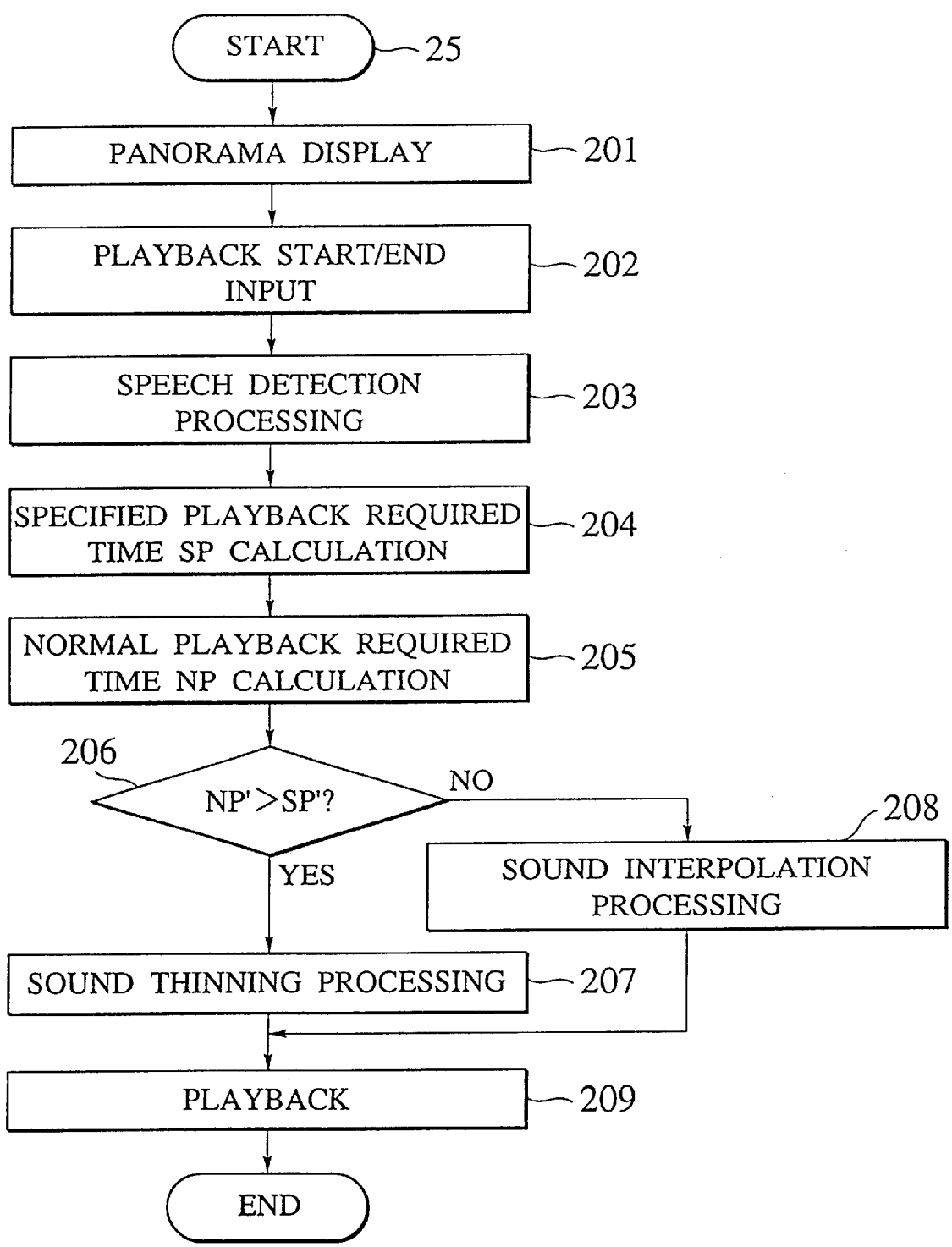
FIG. 11 is a flow chart of a processing to be carried out by the interactive video manipulation and display device of FIG. 10.

Next, the procedure of the processing by the interactive video manipulation and display device of FIG. 10 will be described according to the flow chart of FIG. 11.

Figure 12:
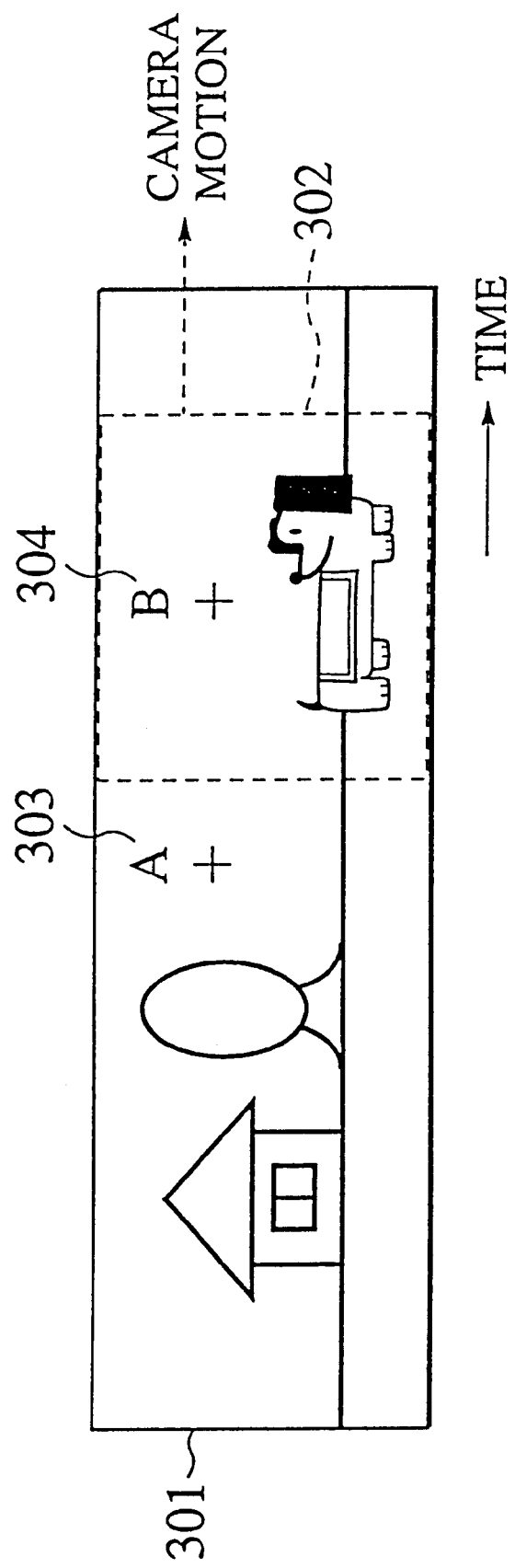
FIG. 12 is a diagram showing an exemplary panorama image used in the interactive video manipulation and display device of FIG. 10.

First, at the step 201, the video data are read out from the video storage unit 102 and a panorama image corresponding to a section through which the camera moves is displayed at the video playback unit 105. The video playback unit 105 is capable of displaying the video by setting the coordinates for displaying the video at the input coordinates entered at the playback start/end input unit 101. FIG. 12 shows an exemplary panorama image displayed at the video playback unit 105. This FIG. 12 shows an exemplary panorama image 301 in the case of panning the camera to the right direction as the time elapses. An image actually imaged by the camera at one moment is roughly a portion enclosed by a dotted frame 302, and the panorama image 301 can be produced by calculating the sequential amounts of movement of the camera and splicing sequentially obtained images with respective displacements corresponding to the sequential amounts of movement of the camera as the time elapses. As a method for producing the panorama image, it is possible to use a method as disclosed by A. Akutsu and Y. Tonomura, "Video Tomography: An Efficient Method for Camerawork Extraction and Motion Analysis", ACM Multimedia 94 Proc., pp. 349–356, October 1994, for example.

Next, at the step 202, the video playback start and end points are entered from the playback start/end input unit 101 according to the panorama image 301 displayed at the video playback unit 105. FIG. 12 shows the playback start point 303 and the playback end point 304. These points can be entered using a pointing device such as mouse. At a time of producing the panorama image 301, the coordinates and the video frames are set in correspondence so that it is possible to specify the video playback start and end points from the coordinates of the specified points.

Next, at the speech detection processing step 203, the speech detection processing is applied to the sound data for an interval between the playback start and end points at the speech detection unit 103. First, the spectrogram of the sound data is calculates, and peaks of the spectra which are stable in the frequency direction over a prescribed period of time are detected. Here, peaks can be detected by utilizing the characteristic that a difference of the adjacent power spectrum values in the frequency direction is large for a peak. The spectrum for speech usually have large variations in the frequency direction so that peaks which are stable in the frequency direction are very likely not those of the speech, so that these peaks are deleted. Then, the detection of harmonic structure is carried out with respect to the spectrogram from which the peaks stable in the frequency direction are deleted. The voiced sounds such as vowel sounds contained in the speech have the harmonics components which are integer multiples of the fundamental frequency, so that the speech can be detected by detecting the harmonic structure. For the detection of harmonic structure, it is possible to use a comb filter.

Next, at the playback speed calculation unit 104, a difference between the time at which the playback end point is specified and the time at which the playback start point is specified is calculated as the specified playback required time SP at the step 204, while the time required for playbacking at the normal speed is calculated as the normal playback required time NP at the step 205 according to the video frames (information regarding frame images to which the playback start and end points correspond) and the frame rate of the video (information regarding a rate at which frames of the video are imaged). Then, either one or both of NP and SP are multiplied by arbitrary coefficients, and resulting values are compared at the step 206. Here, the values resulting from the multiplication of the coefficients are denoted as SP' and NP'.

Then, when SP' is smaller than NP', the sound data is shortened by the sound thinning processing at the step 207 so that the sound data can be playbacked just by the duration of SP'. On the other hand, when SP' is larger than NP', the sound data is elongated by the sound interpolation processing at the step 208 so that the sound data can be playback just by the duration of SP'.

Note that, for the arbitrary coefficient to be used in the above procedure, it is also possible to calculate such a coefficient that SP becomes equal to NP upon multiplying this coefficient to either one of SP and NP. By multiplying such a coefficient, it is possible to make the specified playback required time sufficiently long even when the actual input time is short.

Note also that, in the above described procedure, the video playback positions and the video playback time are both determined by specifying the playback start and end points, but it is also possible to determine the video playback positions by specifying the playback start and end points first, and then further specify start and end points for the purpose of calculating the playback speed at the arbitrary positions on the screen.

Figure 13A:
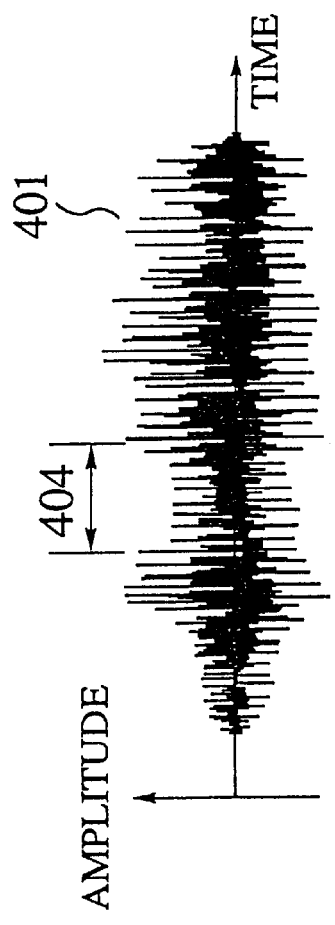
FIGS. 13A, 13B and 13C are diagrams for explaining a sound thinning processing and a sound interpolation processing used in the interactive video manipulation and display device of FIG. 10.
Figure 13B:
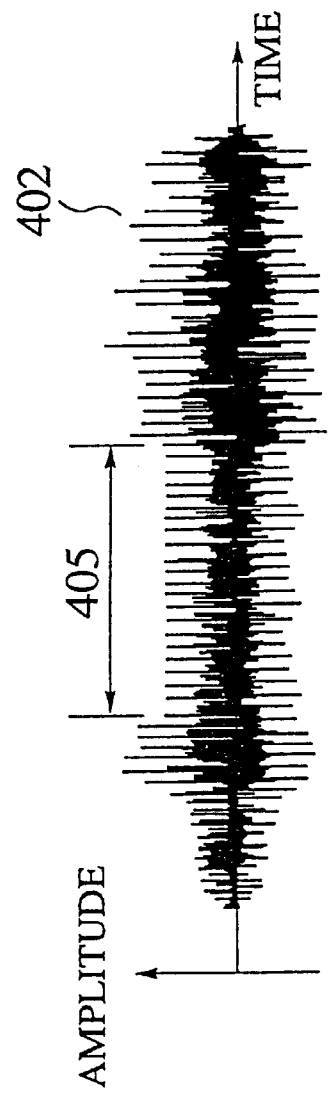
Figure 13C:
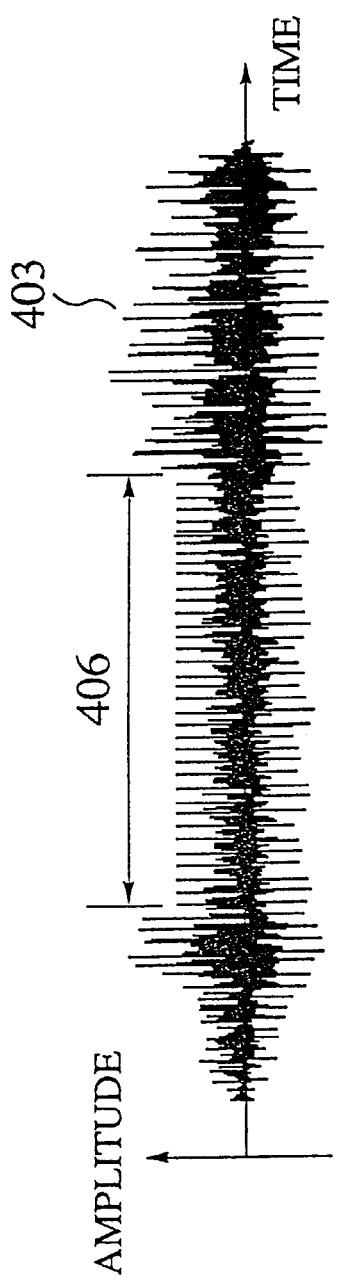

FIGS. 13A and 13C show the waveforms 401 and 403 obtained by the sound thinning processing and the sound interpolation processing from an original sound waveform 402 shown in FIG. 13B. In these processings, the section having similar frequency characteristics are obtained from the original sound waveform 402 first, using the correlation and the like as the measure of similarity. When the section 405 shown in FIG. 13B is the section having the similar frequency characteristics, the sound thinning processing deletes a part in necessary length of the section 405 to produce a thinned section 404, so as to obtain the thinned waveform 401 as shown in FIG. 13A. In the case of the sound interpolation processing, a copy of a part in necessary length of the section 405 is inserted to produce an interpolated section 406, so as to obtain the interpolated waveform 403 as shown in FIG. 13C. Here, the sound thinning processing and the sound interpolation processing of the steps 207 and 208 can be applied only with respect to the speech section detected by the speech detection processing of the step 203. Note that these processings are carried out at the microscopic level with respect to the waveform.

Returning to FIG. 11, finally at the step 209, the video is playbacked at the video playback unit 105. Here, the video to be playbacked can be playbacked in association with the camera motion on the panorama image, or on a separate monitor.

Also, by repeating the series of processing as described above continually by taking the playback start and end points to be infinitesimally close to each other, it is possible to carry out the input of the playback start/end points in a form of sliding over the panorama image, and playback the video in synchronization with the playback start/end points so entered.

Figure 14:
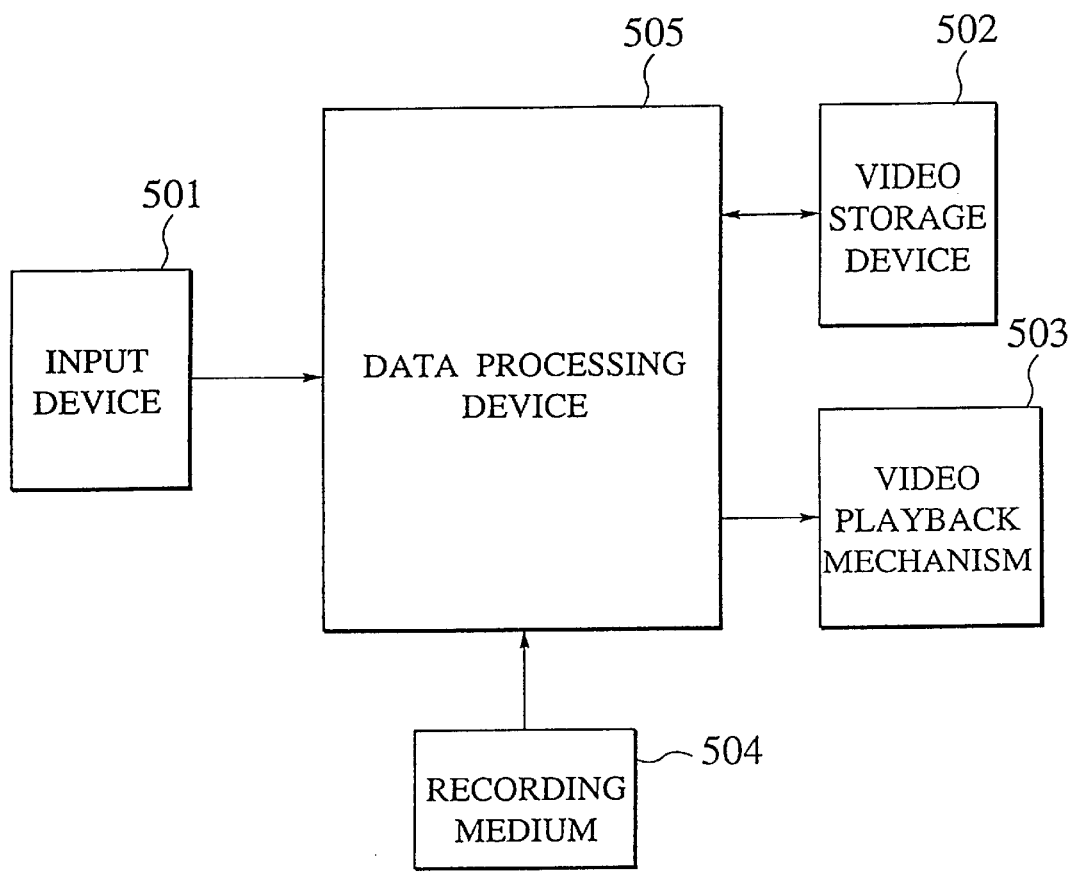
FIG. 14 is a block diagram showing another exemplary configuration of an interactive video manipulation and display device according to the second embodiment of the present invention.

FIG. 14 shows another exemplary configuration of an interactive video manipulation and display device according to the second embodiment, which comprises an input device 501, a video storage device 502, a video playback mechanism 503, a recording medium 504, and a data processing device 505.

The input device 501 is a device for entering the video playback start and end points on the time axis. The video storage unit 502 corresponds to the video storage unit 102 of FIG. 10. The video playback mechanism 503 is a mechanism for playbacking video such as VTR, LD, etc. The recording medium 504 is a medium such as FD, CD-ROM, semiconductor memory, etc., which records software programs for the playback start/end input processing, the speech detection processing, the playback speed calculation processing, and the video playback processing as described above with references to FIG. 10 and FIG. 11. The data processing device 505 reads these programs from the recording medium 504 and executes these programs.

In this configuration of FIG. 14, the above described second embodiment according to the present invention can be conveniently implemented using conventional general purpose digital computers programmed according to the teachings of the present specification, as will be apparent to those skilled in the computer art. Appropriate software coding can readily be prepared by skilled programmers based on the teachings of the present disclosure, as will be apparent to those skilled in the software art.

The recording medium 504 can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

As described, according to this second embodiment, the video playback start and end points are entered on the time axis and the playback speed is calculated, and then the video is playbacked at the calculated playback speed so that it is possible for the user to set up the video playback positions and the video playback speed visually in accordance with the preference of the user at a time of playbacking the video.

Also, according to this second embodiment, the normal playback time required in playbacking the video at the normal speed from the playback start point to the playback end point is calculated, while the playback start/end input time since the playback start point is entered until the playback end point is entered is calculated. Then, either one or both of the normal playback time and the playback start/end input time are multiplied by arbitrary numerical values and compared with each other, and the video playback speed is calculated according to their difference and the size relationship between them, so that the user can set up the playback speed intuitively according to a time interval between the input of the playback start point and the input of the playback end point.

Also, according to this second embodiment, a numerical value that can make the normal playback time equal to the playback start/end input time is calculated and multiplied to the normal playback time or the playback start/end input time so as to normalize the playback start/end input time, so that it is possible to enter the playback start and end points within a time period which is much shorter than the normal playback time even when the normal playback time is quite long.

Also, according to this second embodiment, the playback speed is calculated from a time required in entering arbitrary start point and arbitrary end point on the time axis and the actual time between the start point and the end point, so that it is possible to carry out the input of the video playback positions separately from the input of the playback speed, and therefore the hesitation at a time of specifying the playback end point will not affect the playback speed.

Also, according to this second embodiment, it is possible to playback a series of video portions at partially different playback speeds by calculating the playback speed for each video portion from a time required in entering the consecutively entered playback start and end points and the actual time between the playback start and end points, and storing the calculated playback speed for each video portion. This feature can be utilized for the purpose of checking a body form of an athlete, for example, by repeatedly displaying the same playback pattern.

Also, according to this second embodiment, it is possible to playback each video portion at the same playback speed as that entered in the past, by playbacking each video portion according to the stored playback speed for each video portion.

Also, according to this second embodiment, at a time of entering the video playback start and end points, the amount of movement of the camera that imaged the video is calculated from the amount of movement of the background image, and the displayed panorama image is used as a time axis while sequentially displacing the video frames as much as the calculated amount of movement, so that it is possible to handle the time visually.

Also, according to this second embodiment, at a time of playbacking the video at the speed slower than the normal one, it is possible to extend the playback time without lowering the pitch of the sounds by producing the sound data having the frequency characteristics similar to the sound data of the section for which the level of similarity of the frequency characteristics is maintained for a prescribed period of time and increasing the section that has the high similarity.

Also, according to this second embodiment, at a time of playbacking the video at the speed faster than the usual one, it is possible to shorten the playback time without raising the pitch of the sounds by thinning a part of the sound data in the section for which the level of similarity of the frequency characteristics is maintained for a prescribed period of time.

Also, according to this second embodiment, it is possible to change the playback time efficiently by calculating the spectrogram of the sound data, deleting the spectra which are stable in the frequency direction, detecting the harmonic structure of the spectrum using a comb filter, and applying the processing for thinning or thickening the sound data only to the sections at which the harmonic structure is detected.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An apparatus for interactive video manipulation and display, comprising:

an input unit for entering a start point and an end point on a time axis;

a playback speed calculation unit for calculating a playback speed for a video according to the start point, the end point, and an input time taken since the start point is entered until the end point is entered; and a playback unit for playbacking the video at the playback speed;

wherein the playback speed calculation unit calculates the input time and a normal playback time required in playbacking the video from the start point to the end point at a normal speed, compares the input time and the normal playback time after multiplying arbitrary numerical values to either one or both of the input time and the normal playback time, and calculates the playback speed according to a difference and a size relationship between the input time and the normal playback time after the arbitrary numerical values are multiplied.

2. An apparatus for interactive video manipulation and display, comprising:

an input unit for entering a start point and an end point on a time axis;

a playback speed calculation unit for calculating a playback speed for a video according to the start point, the end point, and an input time taken since the start point is entered until the end point is entered; and a playback unit for playbacking the video at the playback speed;

wherein the playback speed calculation unit calculates a numerical value that can make the normal playback time equal to the input time upon multiplying the numerical value to either one of the normal playback time and the input time, and multiples the numerical to either one of the normal playback time and the input time.

3. An apparatus for interactive video manipulation and display, comprising:

an input unit for entering a start point and an end point on a time axis;

a playback speed calculation unit for calculating a playback speed for a video according to the start point, the end point, and an input time taken since the start point is entered until the end point is entered; and a playback unit for playbacking the video at the playback speed;

wherein the playback unit calculates a spectrogram of sound data contained in the video, deletes peaks of spectra which are stable in a frequency direction, detects a harmonic structure in each spectrum, and applies a processing for thinning or thickening the sound data to sections at which the harmonic structure is detected.

4. A method for interactive video manipulation and display, comprising the steps of:

entering a start point and an end point on a time axis;

calculating a playback speed for a video according to the start point, the end point, and an input time taken since the start point is entered unitl the end point is entered; and playbacking the video at the playback speed;

wherein the calculating step calculates the input time and a normal playback time required in playbacking the video from the start point to the end point at a normal speed, compares the input time and the normal playback time after multiplying arbitrary numerical values to either one or both of the input time and the normal playback time, and calculates the playback speed according to a difference and a size relationship between the input time and the normal playback time after the arbitrary numerical values are multiplied.

5. A method for interactive video manipulation and display, comprising the steps of:

entering a start point and an end point on a time axis;

calculating a playback speed for a video according to the start point, the end point, and an input time taken since the start point is entered until the end point is entered; and playbacking the video at the playback speed;

wherein the calculating step calculates a numerical value that can make the normal playback time equal to the input time upon multiplying the numerical value to either one of the normal playback time and the input time, and mulitples the numerical to either one of the normal playback time and the input time.

6. A method for interactive video manipulation and display, comprising the steps of:

entering a start point and an end point on a time axis;

calculating a playback speed for a video according to the start point, the end point, and an input time taken since the start point is entered until the end point is entered; and playbacking the video at the playback speed;

wherein the playbacking step calculates a spectrogram of sound data contained in the video, deletes peaks of spectra which are stable in a frequency direction, detects a harmonic structure in each spectrum, and applies a processing for thinning or thickening the sound data to sections at which the harmonic structure is detected.

7. A computer usable medium having computer readable program code means embodied therein for causing a computer to function as an apparatus for interactive video manipulation and display, the computer readable program codes includes:

a first computer readable to program code for causing said computer to enter a start point and an end point on a time axis;

a second computer readable program code for causing said computer to calculate a playback speed for a video according to the start point, the end point, and an input time taken since the start point is entered until the end point is entered; and a third computer readable program code for causing said computer to playback the video at the playback speed;

wherein the second computer readable program code calculates the input time and a normal playback time required in the playbacking the video from the playback start point to the playback end point at a normal speed, compares the input time and the normal playback time after multiplying arbitrary numerical values to either one or both of the input time and the normal playback time, and calculates the playback speed according to a difference and a size relationship between the input time and the normal playback time after the arbitrary numerical values are multiplied.

8. A computer usable medium having computer readable program codes means embodied therein for causing a computer to function as an apparatus for interactive video manipulation and display, the computer readable program codes includes:

a first computer readable program code for causing said computer to enter a start point and an end point on a time axis;

a second computer readable program code for causing said computer to calculate a playback speed for a video according to the start point, the end point, and an input time taken since the start point is entered until the end point is entered; and a third computer readable program code for causing said computer to playback the video at the playback speed;

wherein the second computer readable program code calculates a numerical value that can make the normal playback time equal to the input time upon multiplying the numerical value to either one of the normal playback time and the input time, and multiplies the numerical to either one of the normal playback time and the input time.

9. A computer usable medium having computer readable program code means embodied therein for causing a computer to function as an apparatus for interactive video manipulation and display, the computer readable program codes includes:

a first computer readable program for causing said computer to enter a start point and an end point on a time axis;

a second computer readable program code for causing said computer to calculate a playback speed for a video according to the start point, the end point, and an input time taken since the start point is entered until the end point is entered; and a third computer readable program code for causing said computer to playback the video at the playback speed;

wherein the third computer readable program code calculates a spectrogram of sound data contained in the video, deletes peaks of spectra which are stable in a frequency direction, detects a harmonic structure in each spectrum, and applies a processing for thinning or thickening the sound data to sections at which the harmonic structure is detected.

* * * * *

UNITED STATES PATENT AND TRADEMARK OFFICE
CERTIFICATE OF CORRECTION

PATENT NO.    : 6,388,669 B2
DATED         : May 14, 2002
INVENTOR(S)   : Minami et al.

It is certified that error appears in the above-identified patent and that said Letters Patent is hereby corrected as shown below:

<u>Column 3,</u>
Line 26, delete "setin" and insert -- set in --.

<u>Column 5,</u>
Line 47, delete "." following -- this --.

<u>Column 16,</u>
Line 13, delete "codes" and insert -- code --.

Signed and Sealed this

Eighteenth Day of February, 2003

JAMES E. ROGAN
*Director of the United States Patent and Trademark Office*